United States Patent [19]

Graham

[11] 4,069,517

[45] Jan. 24, 1978

[54] MIGRATION-RESISTANT PLASTICIZER FOR VINYL HALIDE POLYMERS

[75] Inventor: Paul R. Graham, Ballwin, Mo.

[73] Assignee: Monsanto Company, St. Louis, Mo.

[21] Appl. No.: 364,801

[22] Filed: May 29, 1973

Related U.S. Application Data

[63] Continuation-in-part of Ser. No. 242,823, April 10, 1972, abandoned.

[51] Int. Cl.$^2$ .......................... A61F 1/24; A61F 1/22
[52] U.S. Cl. ............................................... 3/1.4; 3/1.5;
260/31.2 R; 260/31.6; 260/31.8 R
[58] Field of Search .......... 260/31.8 R, 404.8, 31.2 R, 260/31.6; 3/1.4, 1.5

[56] References Cited

U.S. PATENT DOCUMENTS 3,395,163 7/1968 Clemens ............................ 260/404.8

OTHER PUBLICATIONS

Code of Federal Register, Title 21 Pts. 10–199, Rev. as of 4/1/76, pp. 438, 440–442.
Federal Register, 42 No. 50, (Tuesday, 3/15/77), pp. 14626–14627.
M. Combey in *Plastics*, 34, #377, 290–294 (1969).
Penn *PVC Technology* 3ed., pp. 93, 106, 154–156, 159 (Wiley 1971).

*Primary Examiner*—Thomas De Benedictis, Sr.
*Attorney, Agent, or Firm*—Robert E. Wexler; George R. Beck

[57] ABSTRACT

Vinyl halide polymers containing migration-resistant polyester plasticizers are used in food and drink wrapping and containers and medical tubing and in medical devices for collecting, storing and administering body fluids.

3 Claims, No Drawings

MIGRATION-RESISTANT PLASTICIZER FOR VINYL HALIDE POLYMERS

CROSS REFERENCES TO RELATED APPLICATIONS

This application is a continuation-in-part of copending application Ser. No. 242,823, filed Apr. 10, 1972 and now abandoned.

BACKGROUND OF THE INVENTION

This invention relates to food and drink containers and to medical devices utilized for implantation and prosthetic purposes, for the collection, storage and/or administration of physiological solutions. More particularly, this invention relates to food and drink containers and to medical devices for collecting physiological solutions, such as blood, from mammals, particularly humans, the storage of such physiological solutions and the administration of such physiological solutions to mammals. Specifically, this invention relates to food wrapping and containers, drink containers and to medical devices made from vinyl halide polymers containing a migration-resistant polyester resin as a plasticizer for said vinyl halide polymer.

Vinyl halide polymers, particularly polyvinyl chloride, are the resins of choice from which comestibles wrappings and containers and transporting means are made and from which means such as apparatus and devices are made for collecting physiological solutions from humans, storing the solutions and administering the solutions to humans. Similarly, vinyl halide polymers, particularly polyvinyl chloride, are the resins of choice from which medical tubing is prepared and which may be used for transporting fluids such as gases and physiological solutions to or from the human body or which may be implanted in the human body to supplement or replace diseased body tubes such as arteries. Further, vinyl halide resins are used in medical devices which supplement or replace diseased human organs, such as heart valves.

Vinyl halide polymers per se, i.e., unplasticized vinyl halide polymers, are rigid resins which are not amenable to processing procedures such as are used in the formation of films, tubing, formed articles and the like. Accordingly, the vinyl halide resin must be plasticized and phthalates, particularly di-2-ethylhexyl phthalate, have been the plasticizers of choice for vinyl halide polymers regardless of the end use of such polymers. The selection of phthalates as the industry-wide plasticizers of choice for vinyl halide polymers is based on their ready availability, low cost and the processing characteristics they impart to vinyl halide polymers.

A problem which has recently come to the attention of medical authorities, however, is the evidence of the migration of monomeric plasticizers, especially phthalates, such as di-2-ethylhexyl phthalate, from the vinyl halide polymer article, such as food wrapping, tubing, food or blood bag, syringe or the like, to the gas, food or fluid contained in the article. If the vinyl halide resin article is used for the collection of physiological solutions such as mammalian blood for later testing purposes, it is apparent that the migration of the plasticizer from the tubing in which the blood is collected and the bag in which the blood is stored prior to testing, may introduce a discrepancy in the test results. Further, the presence of monomeric phthalate plasticizers in vinyl halide resin articles such as blood bags and blood administration devices has resulted in evidence of migration of the plasticizer to the physiological solution being administered to the mammalian body. Thus, physiological solutions such as blood, glucose and the like may contain monomeric plasticizer which has been leached from the blood bag, syringe, tube, etc. in which it is stored, collected or administered and the plasticizer is then introduced into the body. It, apparently, is not excreted but is stored within the body. Although no evidence has shown that the storage of monomeric phthalate plasticizers within the mammalian body is harmful to health, the possibility that it may be harmful is a subject of major concern.

Accordingly, it is of importance that liquid and solid comestible packagings, wrappings and containers, drink containers and medical tubing, blood bags, syringes and other collection, storage and administration devices for physiological fluids and for organ supplements and implants in mammalian bodies, particularly in humans, be composed of vinyl halide polymers which contain a plasticizer which does not migrate from the medical article or device to the body or to physiological solutions.

SUMMARY OF THE INVENTION

In accordance with this invention, it has been found that certain polyester resins, hereinafter described, may be used as medically safe, migration-resistant plasticizers for vinyl halide polymers used in the construction of food and drink packaging and in medical apparatus. The polyester plasticizers used in the present invention have superior extraction and migration resistance as compared with monomeric phthalate plasticizers, such as di-2-ethylhexyl phthalate, now being used in these applications. Accordingly, the main objective of this invention is to provide a class of medically safe, migration-resistant and extraction-resistant polyester plasticizers for use in vinyl halide polymers in food and medical applications.

DESCRIPTION OF THE PREFERRED EMBODIMENTS

The above objective is accomplished by using certain polyester plasticizers as replacements for monomeric plasticizers in medical and food applications.

The vinyl halide polymers contemplated herein can be simple, unmixed homopolymers of vinyl chloride, such as polyvinyl chloride or polyvinylidene chloride, or copolymers or terpolymers in which the essential polymeric structure of polyvinyl chloride is interspersed at intervals with the residues of other ethylenically unsaturated compounds copolymerizable therewith. The essential properties of the polymeric structure of polyvinyl chloride is retained if not more than about 40% of a comonomer is copolymerized therewith. Suitable comonomers include, for instance, vinyl halides such as vinyl bromide or vinyl fluoride; vinyl acetate, vinyl chloroacetate, vinyl butyrate and similar vinyl esters, such as fatty acid vinyl esters; vinyl alkyl sulfonates; trichloroethylene; vinyl ethers such as vinyl ethyl ether, vinyl isopropyl ether and vinyl chloroethyl ether; aromatic and cyclic unsaturated compounds, such as styrene, the mono- and polychloro styrenes, cumarone, indene, vinyl napthylene, vinyl pyridine, vinyl pyrrole; acrylic acid and its derivatives such as acrylic amides, e.g., acrylamide, and alkyl acrylates and alkyl methacrylates, e.g., ethyl acrylate, methyl methacrylate, ethyl methacrylate, ethyl chloroacrylate, acrylonitrile and methacrylonitrile; vinylidene compounds, such as vinylidene chloride, vinylidene bromide and vinylidene fluorochloride; unsaturated hydrocarbons such as ethylene, propylene and isobutene; allyl compounds such as allyl acetate, allyl chloride and allyl ethyl ether; conjugated and cross-conjugated ethylenically unsaturated compounds such as butadiene, isoprene, chloroprene, 2,3-dimethyl butadiene-1,3, piperylene, divinyl ketone and carboxylic esters such as diethyl maleate and diethyl fumarate. Exemplary copolymers include ethylene/vinyl chloride and vinyl chloride/acrylonitrile copolymers. Exemplary terpolymers include ethylene/vinyl chloride/acrylonitrile, ethylene/vinyl chloride/acrylic acid and ethylene/vinyl chloride/acrylamide. Polyblends are also contemplated.

The polyester plasticizers contemplated for use in the preparation of non-toxic, migration-resistant and extraction-resistant medical and food applications are generally liquid, semisolid or solid polyesters which are acid or alcohol terminated and which are prepared by the reaction of a dicarboxylic acid or mixture thereof with a glycol, as it well known in the art. Termination is achieved by addition of a monofunctional acid or alcohol to the difunctional reaction mixture. The polyesters may be saturated or unsaturated polyesters and may be aliphatic, aromatic or mixed aliphatic/aromatic in nature, i.e., the acid or alcohol component, or both, may be aliphatic or aromatic, saturated or unsaturated.

Dicarboxylic acids which are used in preparing the polyesters utilized in the present invention include aliphatic, saturated dicarboxylic acids such as succinic, glutaric, adipic, pimelic, suberic, azelaic and sebacic and aliphatic, unsaturated dicarboxylic acids such as maleic and fumaric.

Glycols which are used in preparing the described polyesters include aliphatic glycols such as ethylene glycol, diethylene glycol, 1,2-propylene glycol, 1,3-propylene glycol, dipropylene glycol, 1,3-butylene glycol, 1,4-butylene glycol, 1,5-pentanediol, 1,6-hexanediol and similar materials. Because of its low order of toxicity, 1,3-butylene glycol is preferred.

Terminator acids which are used to prepare the acid-terminated polyesters utilized in the present invention include aliphatic, saturated, monocarboxylic acids of 2 to 18 carbon atoms such as acetic, propionic, butyric, valeric, caproic, lauric, heptoic, caprylic, pelargonic, capric, myristic, palmitic and stearic acids, as well as aliphatic unsaturated, monocarboxylic acids of 2 to 18 carbon atoms such as vinylacetic, acrylic, crotonic, α-hexenoic, α-octenoic, α-decenoic, α-dodecenoic and oleic acids.

Terminator alcohols which are used to prepare the alcohol-terminated polyesters utilized in the present invention include aliphatic, saturated alcohols of 1 to 20 carbon atoms such as methanol, ethanol, propanol, butanol, isobutanol, amylalcohol, isoamyl alcohol, hexanol, isohexanol, heptanol, isoheptanol, octanol, isooctanol, 2-ethylhexanol, nonanol, isononanol, decanol, undecanol, tridecanol, mixtures of $C_7$, $C_9$, $C_{11}$ alcohols, hexadecanol, octadecanol, eicosanol and benzyl alcohol, as well as cyclic saturated alcohols such as cyclohexanol.

The polyesters are prepared by reaction of at least one of each of the described dicarboxylic acids and glycols and a terminator acid or alcohol. Thus, an acid-terminated, saturated polyester is prepared by reaction of an aliphatic, saturated dicarboxylic acid, an aliphatic, saturated glycol and a terminator acid. An alcohol-terminated, saturated polyester is prepared by reaction of an aliphatic, saturated dicarboxylic acid, an aliphatic, saturated glycol and a terminator alcohol. An acid-terminated or alcohol-terminated unsaturated polyester is prepared in the same manner except that an aliphatic, unsaturated dicarboxylic acid, i.e., maleic acid, is substituted for the aliphatic, saturated dicarboxylic acid.

The terminator acid or alcohol may be added simultaneously with the dicarboxylic acid and glycol or the addition of the terminator may be delayed until a polyester of a particular molecular weight has been formed.

Depending on the terminator used, one may obtain a polyester which is water-extractable or which is not water-extractable. For instance, in the reaction of a dicarboxylic acid and a glycol, the resulting polyester will be characterized by pendant carboxyl and hydroxyl groups. Such groups are hydrophilic and afford water solubility characteristics to the polyesters. Addition, during the dicarboxylic acid/glycol reaction, of a terminator acid will afford a reduction of pendant hydroxyl groups. Delayed addition of the terminator acid will result in a further reduction in hydroxyl groups. Alternatively, a non-water extractable, acid terminated polyester is prepared by an additional acylation step, i.e., addition of acetic anydride or the like, to further take up any hydroxyl functionality which may remain.

Preferably, the polyesters contemplated for use in the present invention are saturated, aliphatic, acid terminated, liquid polyesters. Such polyesters are prepared, as described above, by reacting an aliphatic, saturated dicarboxylic acid with a glycol and a terminator acid.

The polyesters which are used in accordance with this invention correspond to the formula

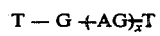

T — G —(AG)$_x$T wherein T is an aliphatic monocarboxylic acid, which may be saturated or unsaturated, having 2 to 18 carbon atoms or an aliphatic, saturated monohydroxy alcohol having 1 to 18 carbon atoms or a cyclic, saturated alcohol; G is a glycol of 2 to 6 carbon atoms; A is an aliphatic dicarboxylic acid of 4 to 10 carbon atoms; and $x$ is an integer of from about 5 to about 15.

Preferred polyesters utilized in accordance with this invention are those polyesters characterized by the structural formula T—G—(AG)$_x$T wherein T is an aliphatic, saturated monocarboxylic acid of about 12 to about 18 carbon atoms and mixtures thereof; G is a glycol of 2 to 6 carbon atoms; A is aliphatic, saturated dicarboxylic acid of 4 to 10 carbon atoms; and $x$ is an integer of from about 5 to about 15.

A particularly preferred polyester for use in accordance with the present invention corresponds to the preferred formula set forth above, wherein T is lauric acid, myristic acid, palmitic acid, stearic acid or mixtures thereof, G is 1,3-butylene glycol, A is adipic acid and $x$ represents an integer of from 8 to 10.

The concentrations in which the polyester plasticizers are present in the vinyl halide polymer may be from about 1 to about 150 parts of plasticizer per 100 parts of resin (phr). Preferably, however, the plasticizer is present in a concentration of from about 3 to about 75 phr although higher and lower concentrations are acceptable.

The polyesters used in the present invention are usually prepared by reacting the dicarboxylic acid, glycol and terminator in a desired molar ratio, e.g. 1:2:0.1. The ratio of dicarboxylic acid to terminator is adjusted to obtain an $n$ value in the range of from about 5 to about 15, preferably from about 8 to about 10. An excess of glycol or acid is used, depending on the particular polyester desired. The reaction is normally carried out in two steps, i.e., an initial heating step at a temperature sufficient to drive off the water which is formed during the reaction and a second, higher heating step at reduced pressure.

Vinyl halide polymers containing the described polyester plasticizers may be utilized to prepare a variety of food packaging and medical devices and apparatus which must be non-toxic and which must be resistant to plasticizer migration and extraction. Such devices include medical tubing for the collection and administration of physiological solutions and medical tubing which is inserted into the body cavity, e.g., arterial replacements and endotracheal tubing. Other medical apparatus which may be prepared from the polyester-plasticized vinyl halide polymers described above are devices, such as syringes, catheters and tubes, for collecting physiological fluids. Physiological solution storage apparatus which may be prepared using polyester plasticizers include vials, bottles, bags and other containers. The administration apparatus for physiological fluids include syringes, tubing, bottles and various intravenous equipment for administering such physiological solutions.

Food and drink packaging which may be prepared from polyester-plasticized vinyl halide polymers include fresh fruit and vegetable wrappings, milk carton interliners, cook-in-the-bag type packages for frozen foods and a variety of films, closures and cap liners for food and drink applications and for packaging and storing liquid and solid medicines.

The following examples will serve to illustrate certain non-limiting preferred embodiments within the scope of this invention.

EXAMPLE 1

This example serves to illustrate the preparation of an acid-terminated, saturated polyester which may be utilized for the purposes of this invention.

To a stainless steel reactor, equipped with a fractionating column, there is charged 1,3-butylene glycol, adipic acid and a mixture of myristic, palmitic and stearic acids, in a mole ratio of 2:1:0.1 but using a slight excess of glycol. Esterification is conducted at atmospheric pressure at a temperature of 150°–200° C.

After primary esterification is complete, the pressure is reduced and the reaction is completed under increased temperature, i.e., 250°–400° C.

When polyesterification is complete, as determined by cessation of glycol distillation, the batch is cooled, cleaned and filtered.

The polyester has the following physical properties:

| Property | Description |
| --- | --- |
| Appearance | Clear, viscous liquid |
| Acidity, meq. KOH/100 g. | 1.25 |
| Iodine no. | 0 |
| Boiling Point (4mm) | 250° C. |
| Flash point, Cleveland open cup, ° F. | 530 |
| Fire point, Cleveland open cup | 570 |
| Molecular weight | Approximately 1,500 – 3,000 |
| Solubility in water | Insoluble |

In accordance with the above procedure, polyesters are prepared having similar properties from the following reactants:
   a. maleic acid, 1,3-butylene glycol and a mixture of myristic, palmitic and stearic acids (i.e., unsaturated polyester-acid terminated);
   b. adipic acid, 1,3-butylene glycol and 2-ethylhexanol (i.e., saturated polyester-alcohol terminated);
   c. fumaric acid, 1,3-butylene glycol and isohexanol (i.e. unsaturated polyester-alcohol terminated).

EXAMPLE 2

This example compares the performance of the polyester of Example 1 with the performance of di-2-ethylhexyl phthalate in polyvinyl chloride.

The following polyvinyl chloride formulation is prepared:

| Ingredients | Parts by Weight |
| --- | --- |
| Polyvinyl chloride | 100 |
| Plasticizer | As indicated |
| Stabilizer[1] | 1 |

[1]Ca/Zn salt

The following tests are conducted to compare the properties of the polyester plasticizer of Example 1 and dioctyl phthalate. The comparative properties are set forth in the table below:

| Property | Polyester | | DOP[1] | |
| --- | --- | --- | --- | --- |
| | 50 PHR | 67 PHR | 50 PHR | 67 PHR |
| Low Temp. Flexibility, $T_f$, ° C. | −9 | −21 | −27 | −39 |
| Volatility, % Plasticizer Lost (6 days at 87° C.) | 2.0 | 2.2 | 20.6 | 16.6 |
| Hardness, Shore "A" Units | 87 | 76 | 82 | 67 |
| Tensile Strength, psi | 2900 | 2600 | 2890 | 2260 |
| Modulus a 100% Elongation, % | 2100 | 1400 | 1650 | 990 |
| Elongation, % | 320 | 405 | 340 | 400 |
| Hexane Extraction (4 hrs a 25° C.) %, Plasticizier Lost | 2 | 2 | 62 | 74 |

[1]Di-2-ethylhexyl phthalate

The polyesters 1a, 1b and 1c show similar comparable characteristics.

EXAMPLE 3

Specimens of polyvinyl chloride film plasticized with the polyester of Example 1 are exposed to the food-simulating solvents (heptane, water, ethanol, acetic acid) in an FDA-prescribed cell as set forth and described in the appropriate parts of the Federal regulations, Food Additives Section, Part 121, Sub-part F and in the FDA Guidelines for Requirements of Food Additive Petitions, Part II, Section D (1966). The specimens of the polyvinyl chloride film are exposed in the cell until equilibrium extraction rates are reached. The amounts of total non-volatile extractives in the solvent after exposure are measured gravimetrically after evaporation of the solvent. The organic portion of the total extractives is determined by a chloroform extraction of the residue. Infrared spectrometry is used to further characterize the residue. The extractions on 50 phr of the polyester of Example 1 in polyvinyl chloride are shown in the following tables:

TABLE I

Heptane Extractions
(On 0.004" Film)
Extractions[1] at 75° F.

| Time, Hrs. | Total Extractives, mg/in.[2] | |
|---|---|---|
| | Film No. 1[2] | Film No. 2[2] |
| .5 | 0.32 | — |
| 6.0 | 0.73 | 0.75 |
| 7.0 | — | 0.78 |
| 8.0 | 0.75 | 0.82 |
| 9.0 | — | 0.83 |
| 10.0 | — | 0.84 |
| .5 | 0.45 | — |
| 2.0 | 0.73 | — |
| 4.0 | 0.89 | — |
| 6.0 | 0.95 | 0.82 |
| 7.0 | — | 0.85 |
| 8.0 | — | 0.87 |
| 9.0 | — | 0.87 |
| 10.0 | — | 0.87 |

[1] All values adjusted for ratio of the amount of heptane extractives compared to the amount extracted by a fat or oil ( $\frac{mg/in.^2}{5}$ )

[2] Films Nos. 1 and 2 are duplicates

TABLE II

Equilibrium extractions on 0.004" polyvinyl chloride film containing 50 phr of polyester using the FDA cell:
$H_2O$ Extractions
Extractions at 120° F on 0.004" Films

| Time, hours | Extraction, mg/in$^2$ |
|---|---|
| 24 | 0.18 |
| 48 | 0.26 |
| 72 | 0.26 |
| 96 | 0.26 |

Ethyl Alcohol Extractions
50 phr Polyester at 120° F using 0.004" Film

| Time, Hours | Extraction, mg/in$^2$ |
|---|---|
| 24 | 0.20 |
| 48 | 0.27 |
| 72 | 0.31 |
| 96 | 0.31 |

TABLE IV

The following data were obtained on PVC 0.004" film containing the polyester of Example 1.
Acetic Acid (3%) Extractions
50 phr Polyester at 120° F.

| Time, hours | Extraction, mg/in$^2$ |
|---|---|
| 24 | 0.17 |
| 48 | 0.26 |
| 72 | 0.29 |
| 96 | 0.31 |

EXAMPLE 4

This example illustrates the resistance to oil extraction of polyvinyl chloride containing 50 phr of polyester of Example 1. The data shown in the table below are obtained by immersing tared 2 inch discs (preconditioned at 50° C. for 24 hours) into conttonseed oil stored at a desired extraction temperature. After the immersion, the discs are removed from the oil, wiped clean of oil and reweighed.

Cotton Seed Oil Resistance of
PVC Film (Polyester Plasticizer)
Films at 0.004" and 50 phr Plasticizer
(%, Plasticizer Lost)

| Temperature, ° F. | Hrs. 0.5 | Hrs. 2 | Hrs. 24 |
|---|---|---|---|
| 75 | 0.16 | — | — |
| 100 | 0.33 | 0.48 | — |

EXAMPLE 5

This example illustrates the resistance to migration of the polyester of Example 1 from polyvinyl chloride into polystyrene. When a plasticizer migrates from polyvinyl chloride into stressed polystyrene, a catastropic reduction in the critical elongation of polystyrene can occur. This property is extremely important in medical usage, since polystyrene fittings and dripping devices are used in conjunction with plasticized polyvinyl chloride tubing and physiological solution bags. It is important in such aspects to use a plasticizer having a low migration to polystyrene.

To illustrate the migration resistance to polystyrene of the polyester of Example 1, a strip of polystyrene is clamped on a bending form which has a gradually changing radius of curvature to stress the polystyrene at elongations ranging from 0.08 percent to 0.76 percent for a 0.125 inch thick specimen. A strip of plasticized polyvinyl chloride, containing the polyester of Example 1, is placed in contact with the stressed polystyrene.

The stressed polystyrene is checked after each 24 hour period until cracking has ceased. The percent critical elongation is determined from the point on the curved surface where the failure has occured.

The stress cracking index is the ratio of the percent critical elongation of the polystyrene when in contact with plasticized PVC divided by the percent critical elongation of polystyrene in contact in air environment.

In the comparative test described above, the polyester of Example 1 has a percent retention of critical elongation of 33 whereas the comparative percent retention of critical elongation of dioctyl phthalate is less than 24.

Summaries of the results of two-year chronic feeding studies of polyester plasticizer of Example 1 to both beagle dogs and rats, as well as the summary of the three-generation reproduction study in albino rats, are as follows:

1. Two-Year Chronic Oral Feeding to Beagle Dogs

No significant abnormalities are indicated in any of the following parameters at dose levels of 1000, 5000 and 10,000 ppm: food consumption, behavioral reactions, mortality, hematologic studies, blood chemistry studies, urine analyses, organ weights, as well as gross and histologic studies.

2. Two-Year Chronic Oral Feeding to Rats

The results of a two-year chronic rat feeding study, at doses of 1000, 5000 and 10,000 ppm show no significant differences in body weights, organ weights, food consumption, mortality rate, the hematologic studies, clinical blood chemistry, urologic studies between the test animals and the controls. Moreover, there are no abnormal behavioral reactions of histopathologic changes which could be attributed to the polyester plasticizer.

3. Three-Generation Reproduction Studies in Albino Rats

Polyester plasticizer when fed at levels of 1000, 5000 and 10,000 ppm in the diet of albino rats did not affect the desire and/or ability of these animals to mate and for the females to conceive and carry the reporduction process to successful parturition.

The number of pups delivered and the number viable at various points of the lactation period from test animals is comparable to the controls.

The body weights, reactions and general physical appearance of the test progeny are comparable to the controls.

The mortality of the test parental females are comparable to the controls. The body weights and weight gains of the 5000 and 10,000 ppm dosed females are slightly less than respective controls. This is most apparent at the time of sacrifice. However, both gross and histopathology show no differences between the test and control animals.

Mean body weight of the males on the 10,000 ppm level are slightly less than their respective controls, but their reactions and mortality are comparable to the controls. The gross and histopathology conducted on these parental animals and for the other dose levels show no differences between the test and control animals.

Organ weight, organ-to-body weight, and organ-to-brain weight ratios show several significant differences. However, these apparent differences are a reflection of a smaller body weight and do not appear to be a dose-related toxic effect from ingestion of the polyester.

Mating indices, incidence of pregnancy and parturition and gestation times for test animals compare favorably with the control data.

The preferred polyester used in the present invention is unique in that it is the only polyester plasticizer listed under Regulation 121.2511 ("Plasticizers for Polymeric Substances") of the Food and Drug Administration.

In addition to plasticizer, the polyvinyl chloride compositions which are illustrated by the present invention for use in medical and food applications may contain other ingredients such as fillers, colorants, stabilizers, UV absorbers and similar standard vinyl halide processing additives.

While the invention has been described hereinabove with regard to certain illustrative specific embodiments, it is not so limited since many modifications and variations are possible in the light of the above teachings. It is understood therefore that the invention may be practiced otherwise than as specifically described without departing from the spirit and scope of the invention.

The embodiments of this invention in which an exclusive property or privilege are claimed are defined as follows:

1. In a process of supplementing or replacing mammalian body organs using means comprising a vinyl chloride polymer, said polymer being in contact with said body, the improvement wherein said polymer contains a phthalate-free polyester plasticizer of the formula $$T-G+A-G)_xT$$

wherein

T represents a 2–18 carbon atom aliphatic, saturated monocarboxylic acid;

G represents a glycol of 2 to 6 carbon atoms;

A represents an aliphatic dicarboxylic acid of 4–10 carbon atoms; and $x$ is an integer of from 5 to about 15.

2. Process of claim 1 wherein said means is tubing.

3. Process of claim 1 wherein said means is a heart valve.

UNITED STATES PATENT AND TRADEMARK OFFICE
CERTIFICATE OF CORRECTION

PATENT NO. : 4,069,517
DATED : January 24, 1978
INVENTOR(S) : Paul R. Graham

It is certified that error appears in the above-identified patent and that said Letters Patent are hereby corrected as shown below:

Column 7, line 32, in the space between the last line in TABLE II and the heading "Ethyl Alcohol Extractions" there should be inserted --     TABLE III Extractions to equilibrium using 8% ethyl alcohol are run using the FDA cell: --.

Signed and Sealed this

Twentieth Day of June 1978

[SEAL]

Attest:

RUTH C. MASON
Attesting Officer

DONALD W. BANNER
Commissioner of Patents and Trademarks